(12) United States Patent
Loupas et al.

(10) Patent No.: US 12,298,445 B2
(45) Date of Patent: May 13, 2025

(54) METHOD AND SYSTEM FOR ADJUSTING IMAGE GAIN

(71) Applicant: SUPERSONIC IMAGINE, Aix-en-Provence (FR)

(72) Inventors: Thanasis Loupas, Psychico (GR); Matthew Frederic Bruce, Les Milles (FR); Danny Skyba, Snohomish, WA (US)

(73) Assignee: SUPERSONIC IMAGINE, Aix-en-Provence (FR)

( * ) Notice: Subject to any disclaimer, the term of this patent is extended or adjusted under 35 U.S.C. 154(b) by 206 days.

(21) Appl. No.: 17/931,434

(22) Filed: Sep. 12, 2022

(65) Prior Publication Data
US 2023/0015623 A1   Jan. 19, 2023

Related U.S. Application Data

(63) Continuation-in-part of application No. 15/519,651, filed as application No. PCT/IB2014/002601 on Oct. 28, 2014, now abandoned.

(51) Int. Cl.
  *G01S 7/52* (2006.01)
  *G01S 15/89* (2006.01)
  *G06T 7/00* (2017.01)

(52) U.S. Cl.
  CPC ...... *G01S 7/52033* (2013.01); *G01S 15/8979* (2013.01); *G01S 15/8995* (2013.01); *G06T 7/0012* (2013.01)

(58) Field of Classification Search
  CPC .............. G01S 7/52033; G01S 15/8979; G01S 15/8995; G01S 7/52042; G06T 7/0012
  See application file for complete search history.

(56) References Cited

U.S. PATENT DOCUMENTS

| | | | | |
|---|---|---|---|---|
| 5,579,768 A | * | 12/1996 | Klesenski | ........... G01S 7/52033 600/442 |
| 5,677,693 A | * | 10/1997 | Frankot | ............... G01S 13/9023 342/25 C |
| 6,102,859 A | | 8/2000 | Mo | |
| 6,120,446 A | * | 9/2000 | Ji | ....................... G01N 29/2456 600/443 |

(Continued)

OTHER PUBLICATIONS

"Adaptive time gain compensation for ultrasonic imaging" by S D Pye et al, Ultrasound Med Biol, pp. 205-212, 1992.

(Continued)

*Primary Examiner* — Bo Joseph Peng
(74) *Attorney, Agent, or Firm* — NIXON & VANDERHYE (57) ABSTRACT

A medical diagnostic imaging system and method for adjusting image gain compensation when changing from a first imaging state to a second imaging state, where a first image power value is determined from an image acquired in a first imaging state with a first image gain compensation, a second image power value is determined from an image acquired in a second imaging state with an initial second image gain compensation, an image power change value is determined from the first image power value and the second image power value, and an adjusted second image gain compensation calculated from the initial second image gain compensation and the image power change value.

15 Claims, 6 Drawing Sheets

(56) References Cited

U.S. PATENT DOCUMENTS

| | | | | |
|---|---|---|---|---|
| 6,142,942 A | * | 11/2000 | Clark | G01S 7/52025 |
| | | | | 600/443 |
| 6,743,174 B2 | | 6/2004 | Ng et al. | |
| 2002/0116141 A1 | * | 8/2002 | Mo | A61B 8/488 |
| | | | | 702/76 |
| 2003/0236459 A1 | | 12/2003 | Loftman et al. | |
| 2005/0080329 A1 | * | 4/2005 | Uchibori | A61B 8/06 |
| | | | | 600/407 |
| 2008/0096513 A1 | * | 4/2008 | Lim | H04B 1/30 |
| | | | | 455/302 |
| 2011/0054317 A1 | * | 3/2011 | Lin | G01S 7/52033 |
| | | | | 600/443 |
| 2011/0301470 A1 | * | 12/2011 | Sato | A61B 8/13 |
| | | | | 600/463 |

OTHER PUBLICATIONS

International Search Report, dated Jul. 20, 2015, from corresponding PCT application.

* cited by examiner

Transition from Fundamental B-mode Imaging (left) to Tissue Harmonic Imaging (right)
Gain Compensation Disabled

FIG. 7a

Transition from Fundamental B-mode Imaging (left) to Tissue Harmonic Imaging (right)
Gain Compensation Enabled

FIG. 7b

METHOD AND SYSTEM FOR ADJUSTING IMAGE GAIN

This application is a Continuation-in-Part of application Ser. No. 15/519,651, filed on Apr. 17, 2017, which is the National Phase under 35 U.S.C. § 371 of International Application No. PCT/IB2014/002601, filed on Oct. 28, 2014, all of which are hereby expressly incorporated by reference into the present application.

FIELD OF THE INVENTION

The invention relates to medical diagnostic ultrasonic imaging and in particular to methods and systems for adjusting image gain during a transition from a first imaging state to a second imaging state.

BACKGROUND OF THE INVENTION

In the use and operation of a medical ultrasound scanner, such as for visualizing the interior of a body of interest (e.g., tissue and/or organs of a human patient), Gain and Time Gain Compensation (TGC) are two of the most important controls that operator users can use to optimize the appearance of ultrasound images.

The Gain control adjusts the global amount of amplification applied to ultrasound signals received by a transducer of the scanner, and thus controls for example the overall brightness of a B-mode image, whereas the Time Gain Compensation control provides depth-dependent amplification to compensate for the increased attenuation experienced by backscattered ultrasound signals received from increasingly greater depths below the surface of the body being scanned.

In this respect, the Time Gain Compensation can be thought of as a way to define a depth vs amplification curve, for instance by specifying the desired amplification at a few discrete depths, whereas the Gain can be thought of as a mean to globally shift the entire Time Gain Compensation curve up (increased amplification) or down (decreased amplification).

Besides Time Gain Compensation, an imaging system may also offer Lateral Gain Compensation (LGC), able for example to compensate for lateral attenuation in an imaged region by applying varying amounts of amplification in a direction parallel to the transducer face. A medical diagnostic ultrasonic imaging may thus provide a variety of location dependent image gain compensations that define amplification curves as functions of locations in an imaged region.

Because of the importance of image gain and location dependent image gain compensation controls in the context of ultrasound imaging, many attempts have been made to automatically optimize these controls in order to save users from the effort and time required to continually optimize these controls during an ultrasound examination. As a result of these efforts, many modern scanners currently offer automated Gain/TGC optimization features which can be activated by the user when needed or may be running in the background and regularly adjust the TGC curve and overall Gain.

For a review of algorithms used in Gain/TGC optimization, see for example "Adaptive time gain compensation for ultrasonic imaging" by S. D. Pye et al., Ultrasound Med Biol, pp 205-212, 1992. U.S. Pat. Nos. 6,102,859, 6,120, 446, 6,743,174 and U.S. application No. 2003/0236459 A1 also describes examples of such Gain/TGC optimization methods.

While these automated Gain/TGC optimization features show improvements over the fully manual settings, it is still very common for users to use the automatic Gain/TGC features as a first approximation of optimum settings and then to refine the Gain and TGC settings manually to obtain user-optimized Gain and TGC. Manual adjustments of Gain and TGC are often performed several times per minute to follow changes in the image content as the user moves the transducer to investigate different structures of interest, or changes in imaging parameters that affect image brightness in a local or global manner.

Transitions between imaging states, for instance switching from Fundamental to Harmonic B-mode imaging, or from B-mode-only imaging to a composite imaging mode (B-mode plus Color Doppler, B-mode plus Elastography, etc.), are also extremely common during a typical ultrasound examination. During a transition between imaging states, Gain and TGC settings almost always have to be adjusted to obtain optimum image quality for the specific conditions of the new imaging state.

Unfortunately, the Gain and TGC settings applied just before the transition cannot be carried over "as is" to a new imaging state where many parameters which have a direct impact on local and global brightness may have changed. As a result, the user frequently needs to re-optimize the B-mode Gain and TGC immediately after the transition, something that increases the time and effort of the examiner by a considerable amount, since such transitions are extremely common during a typical ultrasound examination.

SUMMARY OF THE INVENTION

The instant invention is directed to a method, and a system, for adjusting the image gain compensation of an ultrasound image during a transition from a first imaging state to a second imaging state that does not exhibit the above mentioned limitations.

To this aim, a first object of the invention is thus, in a medical diagnostic imaging system, a method for adjusting image gain compensation during a transition from a first imaging state to a second imaging state, the method comprising the steps of:

determining at least one first image power value based on at least one image acquired in a first imaging state with a first image gain compensation;

determining at least one second image power value based on at least one image acquired in a second imaging state with an initial second image gain compensation;

determining at least one image power change value based on said first image power value and said second image power value; and determining at least one adjusted second image gain compensation based on said initial second image gain compensation and said image power change value.

With these features, it is possible to achieve an improvement in that local and/or global brightness patterns in the ultrasound image obtained after a transition from a first imaging state to a second imaging state are similar to the brightness patterns in the ultrasound image before the transition.

In some particular embodiments, the inventive method might further comprise the steps of:

receiving a request to perform a transition from a first imaging state to a second imaging state;

storing at least one image acquired in the first imaging state with a first image gain compensation, e.g. as digital image data;

switching from the first imaging state to the second imaging state;

determining an initial second image gain compensation;

storing, e.g. as digital image data, at least one image acquired in the second imaging state with the initial second image gain compensation;

determining the first image power value based on said image acquired in the first imaging state;

determining the second image power value based on said image acquired in the second imaging state;

determining the image power change value based on said first image power value and said second image power value; and determining the adjusted second image gain compensation based on said initial second image gain compensation and said image power change value, wherein any one or more of the image gain compensation is a global gain of the image;

the image gain compensation is a location dependent image gain compensation, in particular time gain compensation or lateral gain compensation;

a plurality of first image power values is determined, being associated to locations in said at least one image acquired in a first imaging state, a plurality of second image power values is determined, being associated to locations in said at least one image acquired in the second imaging state with the initial second image gain compensation, a plurality of image power change values is determined based on said plurality of first image power values and said plurality of second image power values, and an adjusted second image gain compensation is determined based on said initial second image gain compensation and said image power change values, said images comprise beamformed signal values of ultrasound acquisitions, said beamformed signal values being obtained at the output of a module of a mid-end processing or a back-end processing portion of a signal processing chain of the medical diagnostic imaging system, the image power change value is compensated for effects that at least one subsequent module of the signal processing chain of the medical diagnostic imaging system have on signal power in the first imaging state and the second imaging state, said images comprise envelope values of beamformed ultrasound acquisitions obtained at the output of an envelope detection module of a signal processing chain of the medical diagnostic imaging system, said image power values comprise mean power values of said envelope values, the image power change value is determined by dividing the first image power value by the second image power value, the image power change value is determined as a function of a first compression threshold and a second compression threshold, said compression thresholds being respectively used by a log compressor module of a signal processing chain of the medical diagnostic imaging system, respectively in the first imaging state and the second imaging state, and during a step of storing at least one image acquired, a plurality of n images is stored, n being a multiple of a number of steering angles used to form a spatially compounded frame.

The method may further comprise a step of applying the adjusted second image gain compensation to image data of an image acquired in the second imaging state, and displaying the image acquired in the second imaging state with the adjusted second image gain compensation, where any one or more of:

the first imaging state differs from the second imaging state, the first imaging state differs from the second imaging state by at least one of the following features: amplitude of the transmit voltage, duration of the transmit voltage, acoustic power, number of focal zones, location of focal zones, dynamic range, compression curve characteristics, central frequency of the transmit ultrasound pulse, bandwidth of the transmit ultrasound pulse, filter applied to the received ultrasound signals, fundamental or harmonic imaging mode, number of steering angles, range of steering angles, spatial compounding, spatial compounding options, transmit apertures, receive apertures, line densities, B-mode-only imaging or composite imaging, temporal versus spatial resolution optimization setting, penetration versus spatial resolution optimization setting, and the first imaging state and the second imaging states are B-mode imaging states and/or composite imaging states comprising a B-mode imaging states.

Another object of the invention is a medical diagnostic imaging system configured to implement the method as described above, for example comprising at least:

means of acquiring at least one image in a first imaging state with a first image gain compensation and at least one image acquired in a second imaging state with an initial second image gain compensation;

means of determining a first image power value based on said image acquired in a first imaging state;

means of determining a second image power value based on said image acquired in a second imaging state;

means of determining an image power change value based on said first image power value and said second image power value; and means of determining an adjusted second image gain compensation based on said initial second image gain compensation and said image power change value.

BRIEF DESCRIPTION OF THE DRAWINGS

Other characteristics and advantages of the invention will be readily apparent from the following description of several of its embodiments, provided as non-limitative examples, and of the accompanying drawings.

On the drawings.

On the different Figures, the same reference signs designate like or similar elements.

DETAILED DESCRIPTION

Figure 1:
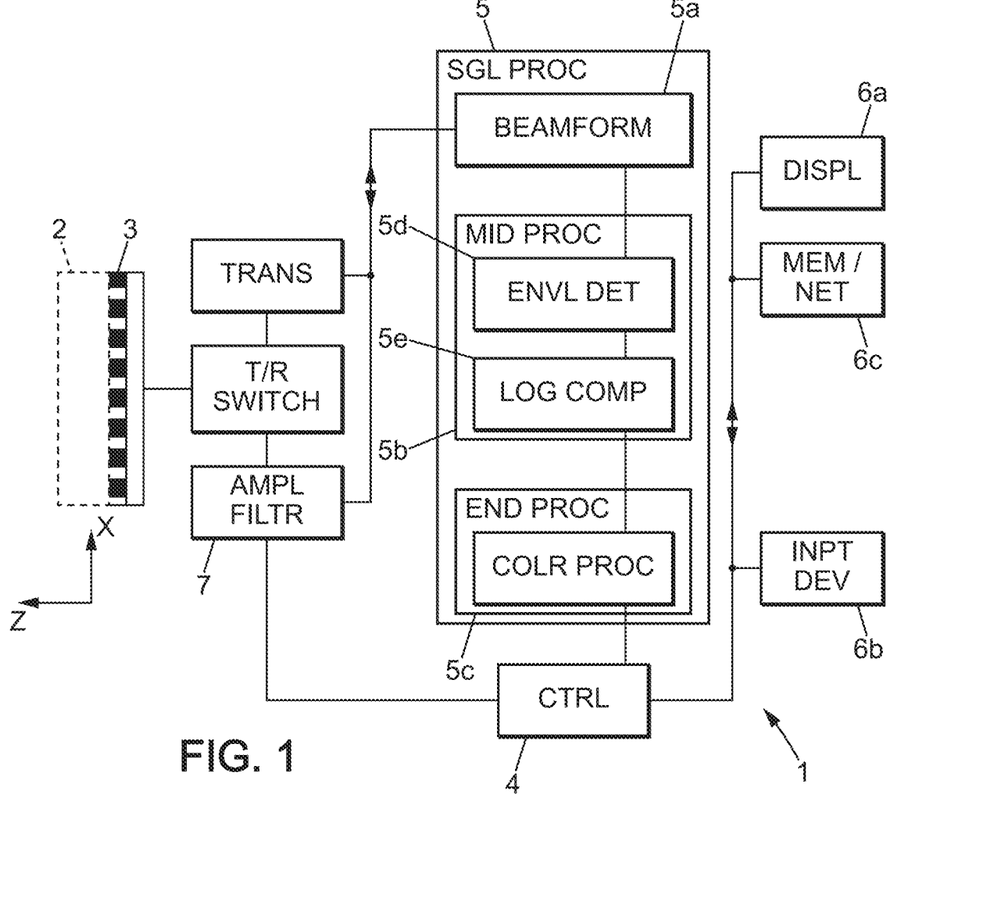
FIG. 1 diagrammatically illustrates a medical diagnostic imaging system 1 according to an embodiment of the invention.
Figure 5:
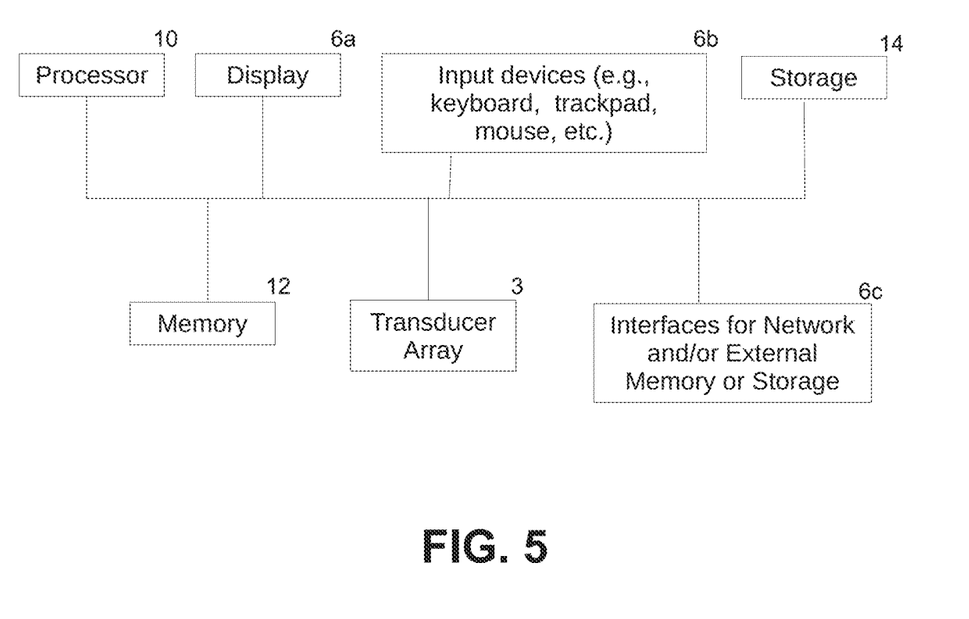
FIG. 5 is a diagram showing an arrangement of electronic components for implementing an embodiment of the invention.
Figure 6:
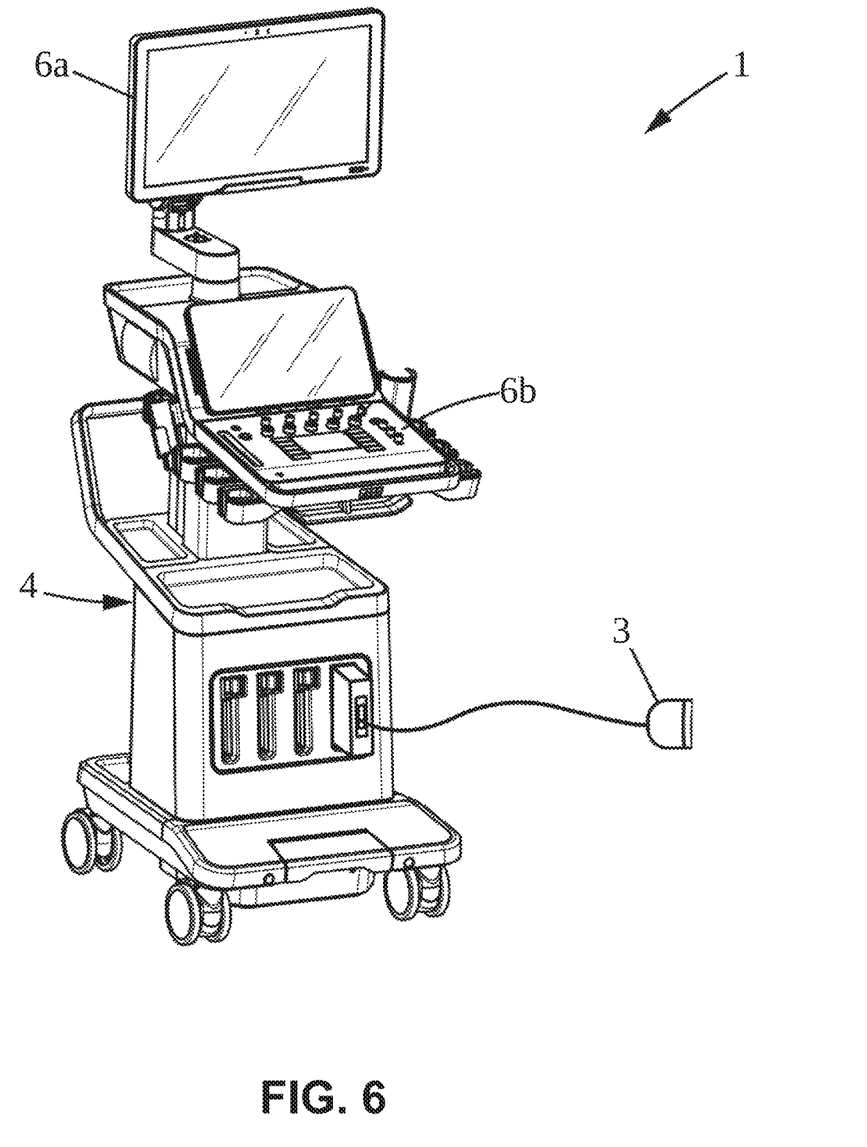
FIG. 6 presents an example embodiment of a medical diagnostic imaging system 1 in accordance with the invention.

FIG. 1 diagrammatically illustrates a medical diagnostic imaging system 1 according to an embodiment of the invention, which may comprise electronic components in communicative arrangement as shown in FIG. 5, and implemented as a machine as shown in FIG. 6.

The imaging system 1 is able to perform ultrasound imaging of a region 2 of a medium to obtain final images that can be any of displayed to a user or operator of the imaging system 1, stored in a memory, and/or transferred to a remote server or processing device.

The imaging system 1 is configured to acquire images in various imaging modes such as (but not limited to) A-mode, B-mode, CW-Doppler, PW-Doppler, Color Doppler, Power Doppler, M-mode, Harmonic Imaging, Shear wave imaging, Elasticity/Strain Imaging. The imaging system 1 may further be configured to acquire images in a composite imaging mode that combines two or more of the above mentioned imaging modes.

To this end, the imaging system 1 comprises an array of transducers 3 for transmitting ultrasonic waves into the region 2 and receiving waves reflected therefrom, a control unit 4 comprising a processor 10, memory 12, one or more storage devices 14, and an interface for operating and receiving data of the reflected waves from the transducer array 3, the control unit 4 also comprising various input/output interfaces, such as a display device 6a, and user-interface controls or input devices 6b such as a keyboard, trackpad, mouse, etc., and network and/or external memory or storage interfaces 6c.

The control unit 4 is configured via software (e.g., recorded in the memory), hardware, or a combination of these, or via any other applicable means, to process the signals received from the transducer array 3 into image data, comprised of digital pixel data and arranged as frames, stored in the memory of the controller and that form an image when displayed on the display device 6a or a display device of a remote device.

The control unit 4 implements a plurality of modules that together comprise a processing chain 5 for controlling and processing the signals received from the array of transducers 3 into the image data.

The array of transducers 3 is, for example, a linear array typically including a few tens of transducers (for instance 100 to 300) juxtaposed along an axis X as already known in usual echographic probes (the array 3 is then adapted to perform a bidimensional (2D) imaging of the region 2, but the array 3 could also be a bidimensional array adapted to perform a 3D imaging of the region 2).

The transducers 3 are controlled independently of one another by the control unit 4, e.g. a beamforming module 5a of the signal processing chain 5 to emit ultrasound waves into the medium and acquire ultrasound signals comprising echoes generated by the ultrasound waves interacting with scatters in the region 2.

The ultrasound signals are then amplified by an amplifier unit 7 to obtain an amplified signal before being processed by the signal processing chain 5.

The amplifier unit 7 may comprise for example a variable controlled amplifier and a low pass filter.

The amplifier unit 7 is configured to apply a global gain to the ultrasound signals. The amplifier unit 7 is also configured to apply location dependent image gain compensation, which may be carried out for example by time gain compensation and/or lateral gain compensation.

The amplifier unit 7 is controlled by the control unit 4 to be apply various gain compensations to the ultrasound signals as a function of the time of acquisition of the reflected ultrasound signals.

The amplifier unit 7 can also comprise a digital module as part of the signal processing chain 5 in order to apply global gain and/or location dependent image gain compensation. In some embodiments, the amplifier unit 7 may comprise only digital modules.

Since the time of acquisition of an ultrasound signal is directly related to the location of a scatterer that reflects said ultrasound signal in the region 2, the amplifier unit 7 is thus able to apply location dependent image gain compensation.

The signal processing chain 5 may comprise various modules 5a, 5b, 5c, 5d, 5e that process the amplified signal according to a specific imaging state in order to obtain a final image of the region 2.

The "imaging state" is the order and the selection of processing steps that lead to a final image to be displayed, stored, and/or transferred to a remote device, and also includes the parameters and settings associated with these processing steps. An imaging state thus comprises the selected imaging mode (B-Mode, Doppler, etc.) and the various parameters used by the control unit 4 in the acquisition and processing of the ultrasound signal, including but not limited to the amplitude and duration of the transmit voltage applied to the transducer array 3, acoustic power, number of focal zones, location of focal zones, dynamic range, compression curve characteristics, central frequency of the transmit ultrasound pulse, bandwidth of the transmit ultrasound pulse, filter applied to the received ultrasound signals, fundamental or harmonic imaging mode, number of steering angles, range of steering angles, spatial compounding, spatial compounding options, transmit apertures, receive apertures, line densities, B-mode-only imaging or composite imaging, temporal versus spatial resolution optimization setting, penetration versus spatial resolution optimization setting.

In the present description, any change occurring to one of the above characteristics of an imaging state can be considered as triggering a transition between a first imaging state, before the change in said characteristic, to a second imaging state, after the change in said characteristic.

Examples of transition between a first imaging state and a second imaging state include (but are not limited to) changing an amplitude and/or duration of the transmit voltage applied to the transducer array 3, changing from Resolution to Penetration optimization, switching from Fundamental to Harmonic imaging and vice versa, or changing from B-mode-only to B-mode plus Color Doppler.

During such a transition between imaging states, image gain and location dependent image gain compensation almost always have to be adjusted to obtain optimum image quality for the specific conditions of the new imaging state.

Figure 2:
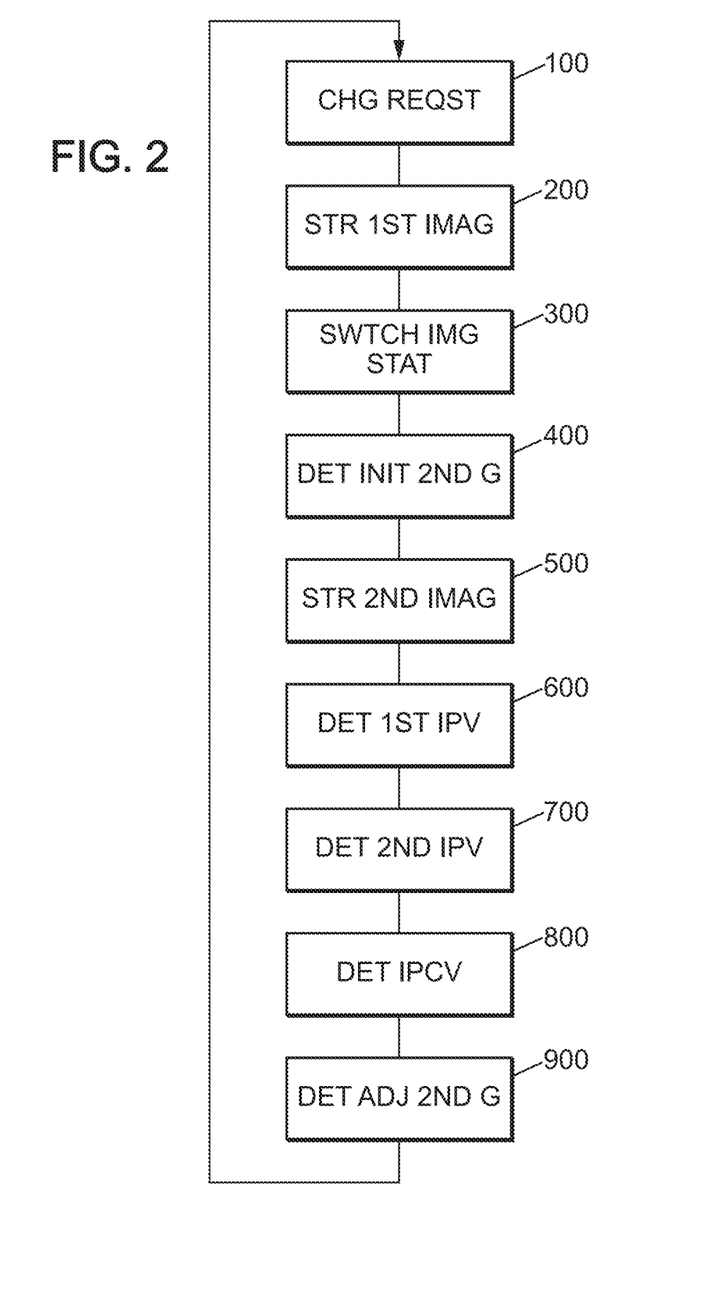
FIG. 2 is a flowchart of a method for adjusting image gain compensation during a transition from a first imaging state to a second imaging state according to an embodiment of the invention.

Referring now also to FIG. 2, according to the present invention, a method for adjusting image gain compensation during a transition from a first imaging state to a second imaging state can comprise the following steps.

Following a request 100 received at the control unit 4, from e.g. an operator pressing a key on the keyboard 6b to perform a transition from a first imaging state to a second imaging state, the method proceeds with a step 200 of storing in the memory at least one image acquired in the first imaging state with a first image gain compensation.

The request to perform a transition may be generated following a command entered by the operator or user (e.g., changing an imaging setting) or may be automatically generated as a result of an automatic process performed by the imaging system 1.

In one preferred embodiment of the invention, the system 1 stores in memory the last N_1 frames of image data acquired in the first imaging state, before the transition. N_1 can be a predefined number that may be selected by the operator or user, automatically adjusted or determined as an optimal number of frames, or can be set on-the-fly during said acquisitions. N_1 can for instance be selected to be a multiple of a number of steering angles used to form a spatially compounded frame before and after the transition in a particular embodiment of the invention where one of the first and the second imaging state comprise a compounded imaging.

"Image" and "frames of image data" refer to digital data representing transducer signal values obtained at the output of any module in the signal processing chain 5.

Images and image data comprise in particular beamformed signal values obtained from the output of the beamforming module 5a, or a module located after the beamforming module 5a along the signal processing chain 5. "Image" and "image data" should in particular be understood to comprise beamformed signal values obtained at the output of a module of a mid-end processing portion 5b or back-end processing portion 5c of the signal processing chain 5.

"Final images" refer to images, e.g., digital image data, obtained at the end of the processing chain 5 to be displayed to the operator or user via the display device 6a, stored in the memory 12 and/or storage 14, and/or transferred to a remote server or processing unit for storage and/or further processing.

The "image" and "image data" can thus for example be taken from anywhere in the signal processing chain 5 between the beamforming module 5a and the display device 6a, for example before or after any of an envelope detection module 5d, log compression module 5e, scan conversion module, spatial compounding module, post-processing module or color mapping module, etc. of the signal processing chain 5.

More specifically, the "image" is comprised of a matrix of pixels, each pixel having coordinates in said image that give the position of the pixel in the image, and a value corresponding to signal value or beamformed signal value determined on the basis of said coordinates. For example, Cartesian coordinates can be used, for example (x, z), x being an abscissa coordinate corresponding to a direction parallel to the face of the transducer array 3, and z being a depth coordinate corresponding to a direction perpendicular to the direction of the transducer array 3 and into a depth of the medium. However, other coordinates methods or modes may be used, without consequences on disclosure effects as scan conversion module can transform coordinates to other ones.

Further, the "image" or "frame of image data" is a "complete scan" of a region of interest in the medium, in the imaging mode selected, where "complete scan" refers to a plurality or series of ultrasound wave emissions and ultrasound signal acquisitions that is sufficient to compute and generate the final image to be displayed, stored in the memory, and/or transferred to a remote server or processing device.

This image, i.e. ultrasound image, produced by the reflected waves resulting from the waves generated by the transducer array 3 and incident on the target region of interest often comprises a speckle noise that corresponds to random fluctuations in the reflection waves from the region of interest. Speckle noise may lead to difficulties for image interpretation. The speckle noise can be reduced to some extent by averaging a plurality of images. Indeed, each image among the plurality of images will have a different speckle noise. The speckle noise also depends on a location in the medium and/or a location in the image. Consequently, the signal values and therefore the image data includes noisy signals, i.e. comprise noisy data, which may be characterized or modeled by statistical mathematical tools.

The inventors have determined that one such mathematical tool is the "power" or "energy" of a random variable, where a random variable (also known as a stochastic variable) is a mathematical formalization of a quantity or object that depends on or is influenced by random events such as noise.

For the purpose of this disclosure, power of a random variable refers to the sum of squared values of the random variable. For example, if $S_k$ is a random variable value of index k comprised between 1 and N, the power Ps of the random variable is expressed as:

$$Ps = \sum_{k=1}^{N} (s_k)^2 \qquad (1)$$

Optionally, this power Ps can be normalized or multiplied by any constant value, and for example, it can be normalized by the number of elements in the series, i.e. the number N.

In this context, the "image power value" refers to the power of an image, i.e. the power of the pixel values in the ultrasound image, where each pixel value is represented as an element of a random variable series.

The image power value may be characterized as a global power of the image, and therefore is calculated for all the pixels in the image. In this case, the image power value is the sum of squared values of all the pixels of the image.

The image power value can also be characterized as a local power of the image, and therefore calculated using a subset of the image pixels representing a particular area of interest within the image. For example, the image power value may be calculated for a group of pixels situated around a specific pixel having a specific location in the image. Therefore in this case, the image power value is the sum of the squared values of said pixels present in the group. Advantageously, the group of pixels corresponds to a rectangle or sub-matrix based around the specific pixel. This image power value is a local value and then can be associated to the location of the specific pixel used to calculate said image power value.

Henceforth, the term "image gain compensation" refers to a global gain of the image and/or one or several location dependent image gain compensations such as time gain compensation and/or lateral gain compensation.

In accordance with the inventive method, the control unit 4 switches at step 300 from the first imaging state to the second imaging state. As detailed above, such a switch may involve switching an imaging mode (A-mode, B-mode, etc.) and/or changing one of the parameters of the signal processing chain 5.

The control unit 4 then determines at step 400 an initial second image gain compensation (INIT_2ND_G) to be used for an initial acquisition in the second imaging state, immediately after the switching 300 from the first imaging state to the second imaging state.

In one, non-limiting embodiment of the invention, the initial second image gain compensation may be identical to the first image gain compensation. Alternatively, the initial second image gain compensation may be adjusted automatically, for instance by an automated Gain/TGC optimization method.

Once the initial second image gain compensation has been determined, the imaging system 1 performs an acquisition in the second imaging state and stores in the memory at step 500 at least one image acquired in the second imaging state with the initial second image gain compensation.

The system 1 in a particular, non-limiting embodiment of the invention stores in memory the first N_2 frames of image data acquired in the second imaging state, after the transition. N_2 can be a predefined number that is be selected by the operator, automatically adjusted by the system 1, predetermined as an optimal number of frames, or set on-the-fly during the image acquisitions.

From the images acquired in the first imaging state and in the second imaging state, it is possible to determine an adjusted second image gain compensation.

First, at least one first image power value is determined at step 600, based on the image acquired in the first imaging state.

In a non-limiting, preferred embodiment of the invention, the first image power value is a single value representative of the global power in the image acquired in the first imaging state. As explained above, the image power value is the power value of all the pixels in the image (i.e., the sum of the squared values of all the pixels in the image). In this case, the first image power value $IPV_1$ may be calculated by:

$$IPV_1 = \sum_{k=1}^{N}(s_k)^2 \quad (2)$$

where N is the number of pixels in the image,
k is an index of the pixels in the image,
$s_k$ is a pixel value in the image (i.e., the image acquired in the first imaging state).

In the case where a plurality of N_1 images is acquired in the first imaging state, the first image power value may be averaged over the plurality of N_1 images, wherein the first image power value is the average (mean value) of the power values of said N_1 images. The calculations can treat all image data values equally, or can give more emphasis to specific frames, steering angles, values that are more likely to represent valid signals instead of noise, etc. In other words, the averaging may incorporate a weighting of the power values from each image part of the plurality of N_1 images. The first image power value $IPV_1$ can be calculated by:

$$IPV_1 = (1/N\_1) \cdot \Sigma_{j=1}^{N\_1} a_j \cdot (\Sigma_{K=1}^{N}(s_k)^2) \quad (3)$$

where j is an index of the plurality of N_1 images,
$a_j$ is a weight associated to image of index j,
N is the number of pixels in each image,
k is an index of the pixels in an image (an image of index j, this index not being shown in above formula for sake of simplification), and
$s_k$ is a pixel value in an image (an image of index j).

In one embodiment of the invention, a plurality of first image power values is determined. The plurality of first image power values is associated to locations in the image, or the plurality of images, acquired in the first imaging state.

In other words, each first image power value $IPV_{1,m}$ of index m, in a plurality of M first image power values, corresponds to:

a local power of an image as explained above, i.e. a power value of a group of pixels in the image (sum of squared values of the pixels in the group), and said first image power value can be associated to a location corresponding to a specific pixel in the image, the group of pixels being preferably around said specific pixel, and each one of the first image power values $IPV_{1,m}$ may be calculated by:

$$IPV_{1,m} = \sum_{k=1}^{N_m}(s_k)^2 \quad (4)$$

where Nm is the number of pixels in group of pixels,
k is an index of the pixels said group of pixels,
$s_k$ is a pixel value in the image (i.e., the image acquired in the first imaging state);
or
a specific image in the plurality of N_1 images; and each one of the first image power values $IPV_{1,m}$ is a global power of an image in the plurality of N_1 images, and is calculated as in equation (2) with the image being the selected image in the plurality of N_1 images.

Thus, the plurality of first image power values may for example be an array of power values associated to a plurality of depths location along the region imaged.

Next, at least one second image power value is determined at step 700 based on one or more images acquired in the second imaging state.

Accordingly, a plurality of second image power values may be determined and associated to locations in the image, or plurality of images, acquired in the second imaging state with the initial second image gain compensation.

The plurality of first image power values and the plurality of second image power values can thus form respective mean power vs depth curves of the respective image data before and after the transition.

Optionally, if needed, a step of interpolation can be performed on one or both of the plurality of first image power values and the plurality of second image power values. This way, the mean power vs depth curves before and after the transition can have identical spatial sampling.

Then, at least one image power change value IPCV is determined at step 800 based on said first image power value and said second image power value.

When respective first and second image power values are determined, a plurality of image power change values may accordingly be determined, based on said plurality of first image power values and said plurality of second image power values.

The image power change values are indicative of the change in global and/or local image power between the first and the second imaging state. The image power change values are thus obtained by comparing the mean power vs depth curves before and after the transition.

The nature of said comparison depends on the type of the analyzed image data.

For example, in one embodiment of the invention the images may comprise envelope values of beamformed ultrasound acquisitions obtained at the output of an envelope detection module 5d of the signal processing chain 5. The image respectively acquired in the first and second imaging states may thus respectively comprise envelope values of beamformed ultrasound acquisitions obtained in the first and second imaging states.

In this specific example, the image power values may then comprise mean power values of the envelope values, in particular a global mean power value of the images or local power values associated to locations in the images or the imaged region.

Figure 3:
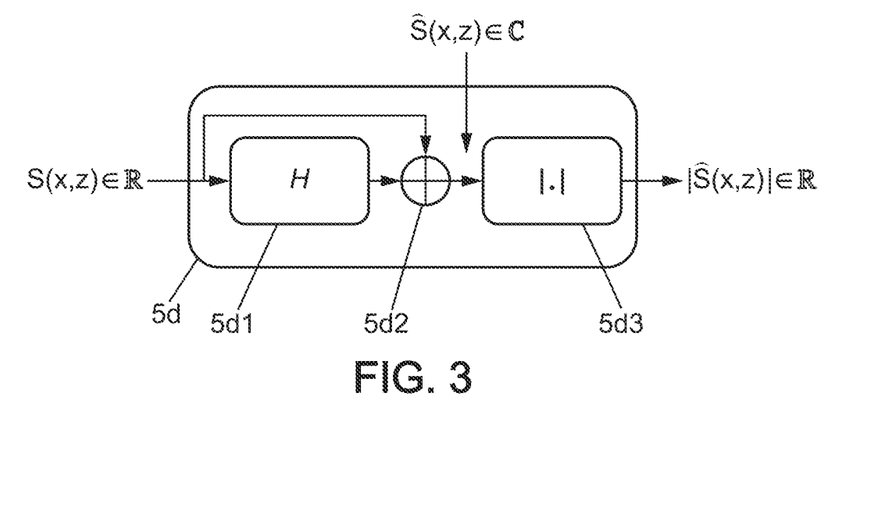
FIG. 3 illustrates an example of envelope determination module that can be used in the system of FIG. 1.

FIG. 3 illustrates an example of the envelope detection module 5d. The envelope detection module 5d comprises a Hilbert transform operator 5d1, a combination operator 5d2 and a module operator 5d3, so as to implement the following formulas:

$$\hat{S}(x,z) = S(x,z) + iH\{S(x,z)\} \quad (5)$$

$$|\hat{S}(x,z)| = \sqrt{\mathcal{R}[\hat{S}(x,z)]^2 + \mathfrak{I}[\hat{S}(x,z)]^2} \quad (6)$$

where S(x,z) represents the signal at the output of beamforming module 5a, said signal depending on chosen (x,z) coordinates in the image,
- x is the abscissa coordinate in the image (usually in the direction of the array of transducers 3,
- z is the depth coordinate in the image, perpendicular to the direction of the array of transducers,
- H is the Hilbert transform,
- $\mathcal{R}$ is the real part operator,
- $\mathfrak{I}$ is the imaginary part operator, and
- i is the complex number, such as $i = \sqrt{-1}$.

Next, the image power values IPV at a specific location L of coordinate (x,z) in the image is calculated as:

$$IPV(x,z) = \frac{1}{N_x N_z} \sum_{n=0}^{N_x-1} \sum_{m=0}^{N_z-1} |\hat{S}(x_n, z_m)|^2 \quad (7)$$

where x, z are coordinates in the image (abscissa, depth),
- Nx, Nz are numbers of pixels used in abscissa direction and in depth direction, and
- $|\hat{S}(x_n, z_m)|$ is the envelope value at these coordinates and calculated by beamforming.

Figure 4:
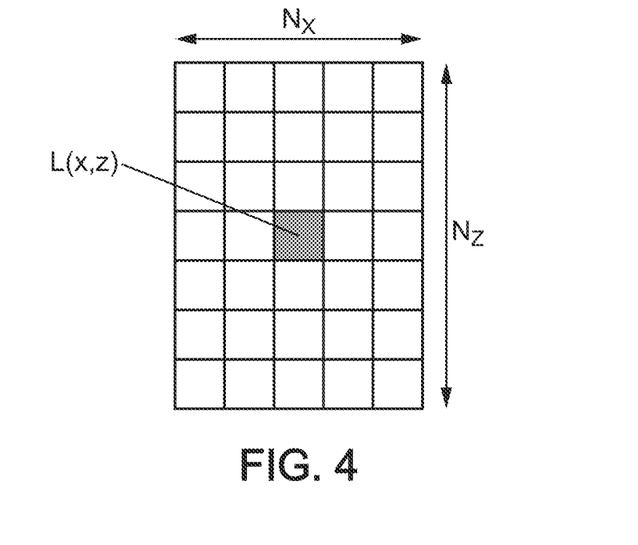
FIG. 4 illustrates a group of pixels around a specific pixel L(x, z), used to calculate a local image power value.

FIG. 4 illustrates an example of group of pixels organized as a rectangle of pixels around a specific pixel L(x,z) in an image.

Next, the first image power value(s) $IPV_1$ may be determined on the image(s) acquired in the first imaging state, and according to any of the above formulas (2), (3), (4), and (7). The second image power value(s) $IPV_2$ may be determined on the image(s) acquired in the second imaging state, with the same formula as applied for the first image power value(s).

Accordingly, the image power change value IPCV may then be determined by dividing the first image power value by the second image power value. Therefore, we may have:

$$IPCV = IPV_1 / IPV_2 \quad (8)$$

Alternatively, image power change values may be determined by dividing first image power values by second image power values that are associated to an identical or close location in the image or the imaged region. For example, we may use the following formula by using results of formula (7) to the first image power values and to the second image power values:

$$IPCV(x,z) = IPV_1(x,z) / IPV_2(x,z) \quad (9)$$

The image power change value can further be compensated for effects that at least one subsequent module of the signal processing chain 5 have on signal power in the first imaging state and the second imaging state.

For instance, in the above example where images comprise envelope values of beamformed ultrasound acquisitions obtained at the output of the envelope detection module 5d of the signal processing chain 5, the image power change value may be compensated for the effects of a log compressor module 5e that follows the envelope detection module 5d.

More precisely, the log compressor module 5e may use a first compression threshold in the first imaging state and a second compression threshold in the second imaging state to compute a log compressed signal.

The image power change value may then be compensated as a function of the first compression threshold and the second compression threshold.

In one specific example, a log compressor and grayscale mapping module in a B-mode imaging state may compute a compressed grayscale value as follows:

$$Y = (20 * \log 10(X) - Ct\_1) * Dr\_Db / 255 \quad (10)$$

where X is the input envelope value,
- Y is the compressed grayscale value, which is subsequently cropped between 0 and 255,
- Ct_1 is the first compression threshold, and
- Dr_Db is a dynamic range of the envelope value.

In this specific example, a compensated image power change value IPC_comp may be determined as a function of the image power change value IPCV, the first compression threshold Ct_1 and the second compression threshold Ct_2 as follows:

$$IPC\_comp = 20 * \log 10(IPCV) - Ct\_1 + Ct\_2 \quad (11)$$

In the above example, the first and second compression thresholds may be in dB units.

Finally, an adjusted second image gain compensation (ADJ_2ND_G) is determined at step 900 based on said initial second image gain compensation and said image power change value or said plurality of image power change values.

In the above example, the adjusted second image gain compensation may be determined simply by summing the initial second image gain compensation and the image power change value, i.e. by the following formula:

$$(ADJ\_2ND\_G) = (INIT\_2ND\_G) + (IPCV) \quad (12)$$

When the initial second image gain compensation is a location dependent image gain compensation, the summing of the initial second image gain compensation and the plurality of image power change values may be performed by summing each initial second image gain compensation value associated to a specific location of the image, or the imaged region, with the image power change value associated to the same location.

Figure 7A:
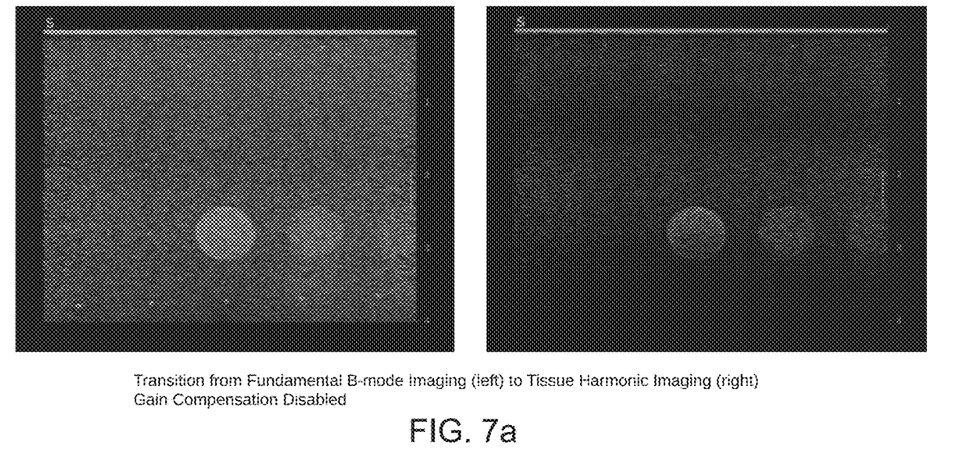
FIGS. 7a-7b show example ultrasound images, illustrating a transition from a first imaging state to a second imaging state, with and without the gain compensation achieved by the invention.
Figure 7B:
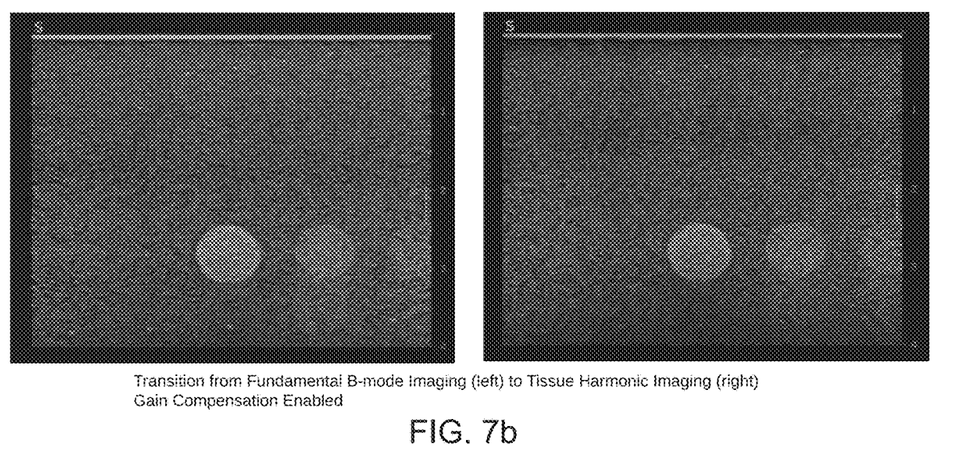

A final image is acquired in the second imaging state with the adjusted second image gain compensation, which may then be displayed to the operator or user, stored in the memory, and/or transferred to a remote server or processing unit. To illustrate the effect of gain compensation, FIG. 7a presents a sample ultrasonic image shown in two different states. In particular, the left and right images of FIG. 7a of ultrasonic images of a human tissue-mimicking phantom, with controlled ultrasound reflectivity and attenuation, characterized by repeatable and quantified acquisitions. The gain compensation is disabled in the images of FIG. 7a, and as a consequence the transition from a first image state of B-mode imaging on the left to a second image state of Tissue Harmonic imaging on the right produces a dark image with little detail. FIG. 7b shows the image transiting between these two states with gain compensation enabled, and as a result the image of FIG. 7b on the right of the second image state is brighter and more legible.

The transition from fundamental B-mode on the left to Tissue Harmonic imaging on the right, with (FIG. 7a) and without (FIG. 7b) gain compensation demonstrates that without the gain compensation, there is a drop of the global brightness between the left and right images of FIG. 7a when one transits from fundamental to harmonic (which is expected and explained by the physics), whereas with the gain compensation of the invention, the global brightness of the Tissue Harmonic image of the right-hand image of FIG. 7b remains almost constant after transition from the fundamental B-mode image of the left-hand image of FIG. 7b. Here, the global (but also possibly local) brightness of the image is a monotonic increasing function of the image power, wherein the lower the image power the lower the brightness, and the higher the image power the higher the brightness.

In a further embodiment of the invention, a smooth transition between imaging states may be created by sequentially acquiring multiple images with the second image gain compensation gradually varying from an initial second image gain compensation to the adjusted second image gain compensation. This gradual variation may be performed in a sequence of small steps to minimize brightness discontinuities. Thus, a series of interpolated second image gain compensations is computed by interpolating between the initial second image gain compensation and the adjusted second image gain compensation.

Also, an optional processing step may comprise a determination of the similarity of the image data acquired in the first imaging state and the image data in the second imaging state. Indeed, a small movement of the patient or the probe/transducers between the time instants in which the first image and the second image are taken leads to errors or artefacts in the method for adjusting the image gain compensation. Therefore, a previous a step of movement correction may be applied on the first image in the first imaging state or reciprocally on the second image in the second imaging state before applying the method of adjusting image gain compensation.

For example, the similarity of the image data acquired in the first and second imaging state is determined by calculating a normalized cross-correlation coefficient operator between the image data in the first imaging state and the image data in the second imaging state in a "moving-window manner." This moving-window manner is a calculation of the normalized cross-correlation coefficient between image data in a first spatial window in the first imaging state and image data in a second spatial window in the second imaging state. The maximum of cross-correlation coefficient allow determining a displacement field (i.e. movement) between the first image in the first imaging state and the second image in the second imaging state.

Then, for each location in the images, an adjusted second image gain compensation may be computed on the bases of images corrected by the similarity of the image data acquired in the first imaging state and the image data in the second imaging state. For example, the similarity can be processed as a preprocessing step of the method of adjusting image gain compensation as above described.

In other words, a spatially-varying combination of the initial second image gain compensation and the adjusted second image gain compensation may then be computed based on the similarity results per location in the images or the imaged region.

This optional processing step may be useful when the image content changes radically before or after the transition, such as when the transducer array 3 is moved rapidly during the transition, or when some regions of a post-transition B-mode image are dominated by noise due to poorer penetration of the new state.

Spatial combinations of the initial second image gain compensation, the adjusted second image gain compensation, and said interpolated second image gain compensation may thus be computed for acquiring images.

For such cases, the actual image gain compensation applied may then vary locally from the initial second image gain compensation, for example in case of lack of similarity, to the adjusted second image gain compensation, for example in case of perfect similarity.

The specific order of the steps 100-900 of the method described above and shown in FIG. 2 is only given as an example and should not be regarded as being limitative in any way.

In particular, several steps or the method, or every step of the method, may be performed in a differing order without departing from the invention. Several steps may also be performed in parallel (i.e., at the same time).

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalents.

The invention claimed is:

1. A method for adjusting image gain compensation during a transition of an image obtained by an imaging system from a first imaging state to a second imaging state, the first imaging state differing from the second imaging state, and the imaging system equipped with an array of ultrasound transducers and generating the image from reflected ultrasonic waves received by the transducer array from a medium of interest, the method comprising the steps of:

determining at least one first image power value based on at least one image acquired in the first imaging state with a first image gain compensation;

determining at least one second image power value based on at least one image acquired in the second imaging state with an initial second image gain compensation;

determining at least one image power change value based on said first image power value and said second image power value;

determining at least one adjusted second image gain compensation based on said initial second image gain compensation and said image power change value; and recording the at least one adjusted second image gain compensation in a memory.

2. The method of claim 1 comprising the steps of:
receiving a request to perform a transition from the first imaging state to the second imaging state;
storing at least one image acquired in the first imaging state with the first image gain compensation;
switching from the first imaging state to the second imaging state;
determining the initial second image gain compensation;
storing at least one image acquired in the second imaging state with the initial second image gain compensation;
determining the first image power value based on said image acquired in the first imaging state;
determining the second image power value based on said image acquired in the second imaging state;
determining the image power change value based on said first image power value and said second image power value; and
determining the adjusted second image gain compensation based on said initial second image gain compensation and said image power change value.

3. The method of claim 2, wherein during a step of storing at least one image acquired, a plurality of n images is stored, n being a multiple of a number of steering angles used to form a spatially compounded frame.

4. The method of claim 1, wherein the image gain compensation is a global gain of the image.

5. The method of claim 1, wherein the image gain compensation is a location dependent time gain compensation or lateral gain compensation.

6. The method of claim 1, wherein:
a plurality of first image power values is determined, being associated to locations in said at least one image acquired in the first imaging state;
a plurality of second image power values is determined, being associated to locations in said at least one image acquired in the second imaging state with the initial second image gain compensation;
a plurality of image power change values is determined based on said plurality of first image power values and said plurality of second image power values; and
an adjusted second image gain compensation is determined based on said initial second image gain compensation and said image power change values.

7. The method of claim 1, wherein said images comprise beamformed signal values of ultrasound acquisitions, said beamformed signal values being obtained at the output of a module of a mid-end processing or a back-end processing portion of a signal processing chain of the medical diagnostic imaging system.

8. The method of claim 7, wherein the image power change value is compensated for effects that at least one subsequent module of the signal processing chain of the medical diagnostic imaging system have on signal power in the first imaging state and the second imaging state.

9. The method of claim 1,
wherein said images comprise envelope values of beamformed ultrasound acquisitions obtained at the output of an envelope detection module of a signal processing chain of the medical diagnostic imaging system,
wherein said image power values comprise mean power values of said envelope values, and
wherein the image power change value is determined by dividing the first image power value by the second image power value.

10. The method of claim 1, wherein the image power change value is determined as a function of a first compression threshold and a second compression threshold, said compression thresholds being respectively used by a log compressor module of a signal processing chain of the medical diagnostic imaging system, respectively in the first imaging state and the second imaging state.

11. The method of claim 1, further comprising a step of displaying an image acquired in the second imaging state with the adjusted second image gain compensation.

12. The method of claim 1, wherein the first imaging state differs from the second imaging state.

13. The method of claim 12, wherein the first imaging state differs from the second imaging state by at least one of the following features: amplitude of the transmit voltage, duration of the transmit voltage, acoustic power, number of focal zones, location of focal zones, dynamic range, compression curve characteristics, central frequency of the transmit ultrasound pulse, bandwidth of the transmit ultrasound pulse, filter applied to the received ultrasound signals, fundamental or harmonic imaging mode, number of steering angles, range of steering angles, spatial compounding, spatial compounding options, transmit apertures, receive apertures, line densities, B-mode-only imaging or composite imaging, temporal versus spatial resolution optimization setting, penetration versus spatial resolution optimization setting.

14. The method of claim 1, wherein the first imaging state and the second imaging state are B-mode imaging states and/or composite imaging states comprising a B-mode imaging state.

15. A medical diagnostic imaging system, comprising:
a transducer array of ultrasonic transducers configured to acquire at least one image in a first imaging state with a first image gain compensation and at least one image acquired in a second imaging state with an initial second image gain compensation;
a control unit in communication with the transducer array and configured to implement a signal processing chain that receives and processes image data received from the transducer array;
a display device;
a user input device; and
a memory that stores the image data and programming information for instructing an operation of the control unit, the programming information configured to cause the control unit to operate at least to:
determine a first image power value based on said image acquired in the first imaging state;
determine a second image power value based on said image acquired in the second imaging state;
determine an image power change value based on said first image power value and said second image power value;
determine an adjusted second image gain compensation based on said initial second image gain compensation and said image power change value; and
record the adjusted second image gain compensation in the memory.

* * * * *